Sept. 24, 1968
G. HIRS
3,403,098
OIL SKIMMERS
Filed June 30, 1966
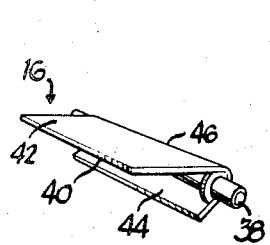
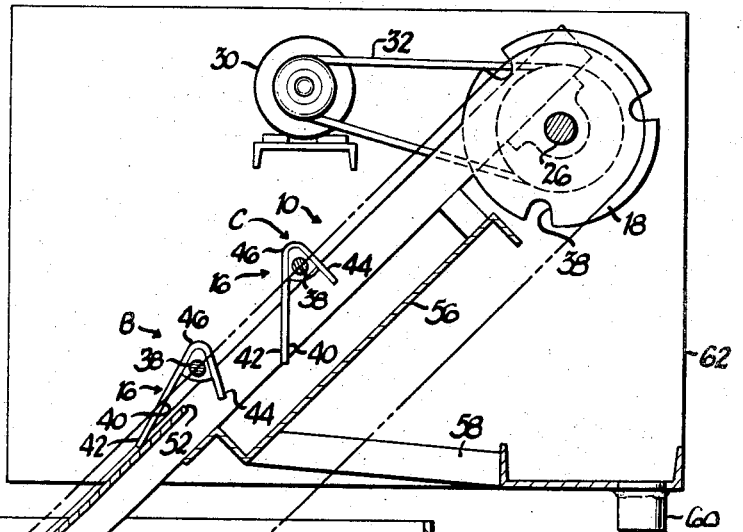
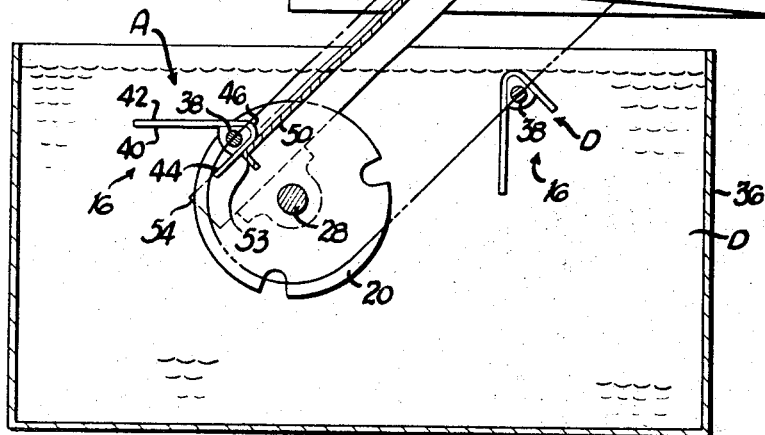
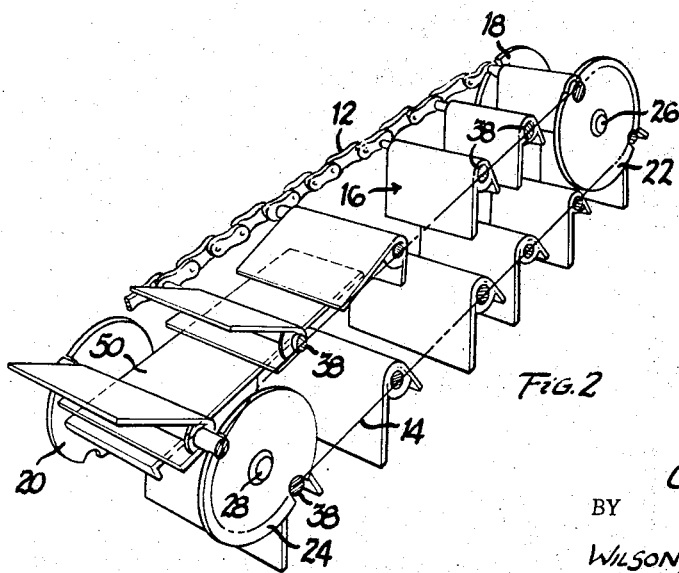
INVENTOR.
GENE HIRS
BY
WILSON, SETTLE, BATCHELDER
ATT'YS. & CRAIG

United States Patent Office 3,403,098
Patented Sept. 24, 1968

3,403,098
OIL SKIMMERS
Gene Hirs, Birmingham, Mich., assignor to Hydromation Engineering Company, Livonia, Mich., a corporation of Michigan
Filed June 30, 1966, Ser. No. 561,816
11 Claims. (Cl. 210—40)

ABSTRACT OF THE DISCLOSURE

A method and device for separating a liquid bath having two liquids of different densities by immersing a flat imperforate plate preferentially wettable by the less dense liquid, moving the plate toward the surface of the bath while maintaining the plate horizontal so that the less dense liquid will adhere to the plate when the plate breaks the surface of the bath, including the plate slightly to drain all of the more dense liquid from the plate surface and then turning the plate vertically so that the gravitational forces will remove the less dense liquid from the plate. The device for moving the plate includes an endless conveyor carrying the plate with means for maintaining the plate horizontal and included through selected portions of the conveyor pattern.

---

This invention relates to skimming apparatus and methods, and more particularly to a method of and apparatus for skimming oil from the surface of a bath containing oil and water, or for similar skimming of other liquids.

It is known that oil has an affinity for certain materials including steel and other metals. Metals are preferentially wetted with oil in a bath containing oil and water, the oil and water being immiscible liquids. If a metal plate is dipped into a bath containing water with oil at the surface thereof, and if the plate is then lifted out of the bath with its major surfaces extending vertically, a certain amount of oil adheres to the plate and is removed by the plate from the bath. This removal of oil is relatively inefficient because during removal the oil remaining in the bath adheres to the oil on the plate and tends to pull it back down into the bath, and also because gravity tends to pull oil from the plate back down into the bath. Thus, there are two forces or factors working against efficient removal of oil from the bath.

It has been found, in accordance with the invention, that if a metal plate is immersed in the same bath and is withdrawn in a horizontal position so as to break the oil at the surface instantaneously, it will remove considerably more oil than if the plate were removed in a vertical position. The efficiency of the removal method is increased greatly by maintaining the plate horizontal as it breaks through the surface of the bath. This can be attributed to two things: (1) the cohesive force of oil to oil is overcome instantaneously as the plate breaks through the surface of the liquid, so there is less tendency for oil in the bath to pull oil from the plate back into the bath, and (2) gravity does not tend to pull oil off from the plate. In these conditions, then, the affinity of the oil for the plate is the overriding force and this tends to hold the oil on the plate. It is possible to remove far more oil, perhaps 7 or 8 times more efficiently, than when the plate is withdrawn in a vertical position.

The invention provides a method of skimming a first liquid from the surface of a bath, which also contains a second liquid heavier than the first liquid and immiscible therewith, by the steps of:

(1) Dipping a skimmer plate into the bath,
(2) Positioning the skimmer plate to place a flat skimming surface thereof in a horizontal submerged position, the first liquid having a greater affinity for the material of the skimming surface than the second liquid, (3) Lifting the skimmer plate to raise the horizontal skimming surface through the surface of the bath to thereby skim from the surface of the bath a quantity of the first liquid, and (4) Recovering the first liquid from the skimming surface.

The apparatus of the invention includes a conveyor which rotates through a bath to transport skimmer plates generally vertically into and out of the bath. A flat skimming surface of each plate is held in a horizontal position as it is moved vertically through the surface of the bath so as to skim a liquid from the surface of the bath. This horizontal positioning of the skimming surface is accomplished by a guide track which extends along the path of the skimmer plates and is engaged by a portion of each plate as it travels along the length of the guide track. In a particular embodiment, each skimmer plate has two portions at an acute angle to each other, one of which has the skimming surface on it and the other of which engages and rides along the guide track to hold the first portion with its skimming surface in a horizontal position. The skimmer plates are pivotally suspended from the conveyor, and when a given plate rides off of the guide track, the plate pivots to a position in which its skimming surface is vertical. The liquid on the plate then drains by gravity off from the skimming surface into a collector which is provided in the apparatus for recovering liquid from the plates.

Accordingly, it is an object of the present invention to skim a liquid from the surface of a bath also containing another heavier liquid and is doing so to achieve an increase in efficiency over known skimming methods and apparatus.

Another object of the invention is to provide a method of skimming oil from a bath of oil and water wherein a flat skimming surface on a skimmer plate is raised in a horizontal position through the oil at the surface of the bath to skim a substantially larger amount of oil from the bath than could be done with the skimming surface in a vertical position.

A further object of the invention is to provide skimming apparatus wherein a plurality of skimmer plates are conveyed in a closed loop path passing vertically into and out of a liquid bath with structure for positioning a skimming surface of each plate in a horizontal position as it breaks through the surface of the liquid when it is raised out of the bath.

Another object of the invention is to provide structure in a skimming apparatus for positioning a skimmer plate in a vertical position after it has been withdrawn through oil at the surface of a water and oil bath in a horizontal position so that oil can drain from the vertical plate into a collector provided in the apparatus.

Other objects of this invention will appear in the following description and appended claims, reference being had to the accompanying drawing forming a part of this specification wherein like reference characters designate corresponding parts in the several views.

On the drawing:

FIGURE 1 is a partly schematic sectional view of a skimmer apparatus in accordance with one embodiment of the invention showing an angle plate in changed positions;

FIGURE 2 is a perspective view of part of the apparatus of FIGURE 1; and

FIGURE 3 is a perspective view of one angle plate included in the apparatus.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

As shown on the drawing:

A skimmer apparatus according to one embodiment of the invention includes a conveyor 10 which has two chains 12 and 14 from which angle plates 16 are pivotally suspended. Chain 12 passes around and is engaged by two sprockets (not shown) on wheels 18 and 20 positioned at opposite ends of the conveyor path, and similarly chain 14 passes around two sprockets (not shown) on wheels 22 and 24 positioned at opposite ends of the conveyor path in spaced parallel relation with the wheels 18 and 20. Wheels 18 and 22 are interconnected by a shaft 26 and wheels 20 and 24 are interconnected by another shaft 28. The wheels 18 and 22 and the associated sprockets are driven by a motor 30 which is connected to the sprockets by another chain 32. The wheels 18 and 22 are rotated clockwise as viewed in FIGURES 1 and 2, and the lower portions of the chains 12 and 14 move generally downward and the upper portions of these chains move generally upward. The wheel and sprockets are mounted on a frame member 54.

The wheels 20 and 24 along with the lower portions of the chains 12 and 14 extend down into a tank 36 which, in the operation of the apparatus, contains the two liquids, one of which is to be skimmed by the apparatus. As previously pointed out, the invention is particularly useful for skimming oil from the surface of a bath containing both oil and water. However, the invention is applicable to the skimming of other liquids which have an affinity for the material of the skimming plates.

Each of the skimming plates 16 is affixed to a rod 38 which extends between the two chains 12 and 14 and is mounted on the chains for rotation about the axis of the rod. Each skimming plate 16 has two portions; a longer portion 40 on which the skimming surface 42 is provided, and a shorter portion 44 which serves to position the longer portion as will be described later herein. The two portions 40 and 44 of the plate 16 are at an acute angle with respect to each other, and the rod 38 extends through the plate along the corner 46 where portions 40 and 44 merge together. The plate 16 is secured to the rod 38 so that as the rod rotates, the plate pivots about the axis of rotation of the rod. FIGURE 1 shows only one of the plates 16, and the plate is shown in changed positions A, B, C, and D to illustrate how the plate is moved and positioned during an operating cycle. A series of plates are shown affixed to the chains in FIGURE 2, and it is evident that the chains 12 and 14 serve to convey a plurality of plates through the liquid in the tank 36 in succession.

The view A of plate 16 in FIGURE 1 shows the plate as it begins upward movement through the liquid in tank 36. The shorter portion 44 of the plate rides along and against a guide track 50 which extends down into the liquid in the tank and also extends for a distance above the surface of the liquid in the tank to its upper end 52. The guide track 50 is a flat sheet or bar of metal which is secured to the frame member 54. It may be seen that the guide track 50 extends at an angle which is equal to the angle between portions 42 and 44 of the skimmer plate 16 so that as the positioning portion 44 of the plate rides along the guide track 50, its longer portion 40 is held with the skimming surface 42 in a horizontal position. Thus, so long as the plate's positioning portion 44 rides along the guide track 50, the skimming surface 42 moves vertically in a horizontal position and passes through the oil at the surface of the bath in tank 36 with the skimming surface maintained in this horizontal position.

When the plate 16 reaches position B in FIGURE 1, the positioning portion 44 of the plate 16 rides off of the guide track 52 and permits the plate 16 to pivot in a counter-clockwise direction until the longer portion 40 of the plate contacts the guide track 50. The plate 16 rides in this position until the longer portion 40 of the plate rides off the track's end 52. When this occurs, the plate 16 pivots to the position shown at C in FIGURE 1. When the plate reaches position C, the longer portion 40 of the plate is in a substantially vertical position.

In position C, the plate 16 is located over a trough 56 which extends along the under side of the plates 16 as they are conveyed upward over wheels 18 and 22. The oil or other liquid which has been removed from the tank 36 by the plate 16 drains off from the plate into the trough 56. The oil then flows through a pipe 58 to a drain pipe 60 provided in the housing 62 which partially surrounds the conveyor. The oil may be fed from outlet 60 to a storage tank or to whatever destination is provided for it.

A description of the operating cycle will begin with the plate 16 in position C as shown in FIGURE 1. The conveyor chains 12 and 14 move about the sprockets as previously described, and carry the plate 16 first in an upward direction and then about the wheels 18 and 22 and downwardly toward the tank 36. The rods 38 are received in recesses 39 in the wheels. Near the end of the downward journey, the plate 16 enters the liquid provided in tank 36 and is submerged therein as shown at position D in FIGURE 1. The conveyor chains carry the plate around wheels 20 and 24 at the lower end of the conveyor until the plate approaches the guide track 50, the bottom end 53 of which is located between wheels 20 and 24. The positioning portion 44 of the plate 16 then comes in contact with the end 53 of the guide track 50, and the plate 16 is pivoted in a clockwise direction until the positioning portion 44 is parallel to and rides on the major surface of the guide track 50. This pivotal movement brings the longer portion 40 of the plate to a horizonal position as shown in position A of the plate 16 in FIGURE 1. The conveyor chains then move the plate 16 upward, and as the longer portion 40 breaks through the surface of the liquid, a quantity of oil is skimmed and picked up on the skimming surface 42 of the plate. This oil is attracted to the plate and preferentially wets the plate so that a film of oil tends to remain on the plate as it continues to move vertically along the conveyor.

The plate 16 then rides upward along guide track 50 to position B where it pivots counter-clockwise to the position shown at B. Some of the oil can run off of the skimming surface 42 at this time but only a small portion of the oil actually runs off in the short time the plate 16 remains in this position wherein the longer arm 40 of the plate 16 is in contact with the guide track 50.

As the plate 16 continues to move upward from position B to position C, the longer arm 40 rides off of the guide track 50, and the plate 16 then pivots further in the counter-clockwise direction to the position C. The longer arm 40 of the plate is in a vertical position and the oil can drain off of the skimming surface 42 into the trough 56 as previously explained. The plate then moves on around to position D in order to start another cycle.

The steps of the method of the invention have been outlined previously and are believed to be evident from the preceding description of operation. The dipping of the skimmer plate into the bath occurs when the conveyor chains 12 and 14 move the plate 16 down into the liquid within the tank 36. The next step is positioning the skimmer plate to place the flat skimming surface 42 in a horizontal submerged position, and this step is illustrated by the view of the plate 16 in position A at the lower end 53 of the guide track in FIGURE 1. Next, the plate 16 is lifted to raise the horizontal skimming surface through the surface of the bath to thereby skim a quantity of oil on the skimming surface 42, and, of course, this occurs as the conveyor chains 12 and 14 move the plate 16 upward through the surface of the liquid in tank 36. The recovering of the oil from the skimming surface of plate 16 occurs when the plate 16 reaches position C as shown in FIGURE 1. The recovering step is carried out by draining the oil from skimming surface 42 into the trough 56.

The invention thus provides an efficient method and apparatus for skimming oil from the surface of a bath containing oil and water, or for similar skimming of other liquids. The efficiency of the skimming operation is much greater than a skimming operation wherein a plate or other object is raised in a vertical position through a liquid to pick up oil from its surface. The method of the invention can be carried out in a straightforward manner and lends itself to the design of practicable automatic skimming apparatus for carrying out the steps of the method automatically.

What is claimed as new is:

1. A method of skimming a first liquid from the surface of a bath comprised of the first liquid and a second liquid heavier than the first liquid and immiscible therewith, said method comprising the steps of moving an imperforate skimmer means in a closed path by supporting said skimmer means on an endless conveyor partially immersed in said bath, positioning said skimmer means substantially vertically of the surface of the bath along a portion of said path, repositioning said skimmer means below the surface of the bath to place a flat skimming surface thereof in a horizontal submerged position, said first liquid having an affinity for the material of said skimming surface which is greater than the affinity of said second liquid therefor, continuing movement of said skimmer means along said path to raise said skimming surface through the surface of said bath while maintaining said skimming surface substantially horizontal to thereby remove from said bath a quantity of said bath on said skimming surface, the greater adherence of said first liquid to said skimmer means enriching the adherent portion of said bath on said skimmer means with the first liquid, and recovering the liquid from said skimming surface.

2. The method of claim 1 in which said first liquid preferentially wets the material of said skimming surface.

3. The method of claim 2 in which said skimming surface is made of metal.

4. The method of claim 3 in which said first liquid is oil.

5. The method of claim 4 in which said second liquid is water.

6. The method of claim 5 in which said skimmer means is a plate having a flat skimming surface.

7. The method of claim 1 in which after said skimmer means has been raised through the surface of said bath with said skimming surface in a horizontal position, said skimmer means is tilted to incline the plane of said skimming surface so that the liquid thereon runs off said skimming surface by gravity, and recovering the liquid running off from said skimming surface.

8. Skimming apparatus comprising skimmer means having an imperforate skimming surface, a liquid bath having a first liquid and a second liquid more dense than said first liquid with said surface being preferentially wettable by said first liquid, conveyor means for transporting said skimmer means vertically into and out of said liquid bath, means suspending said skimmer means from said conveyor means for pivotal movement of said skimmer means relative to said conveyor means, a guide track positioned along a lower portion of said conveyor means where said skimmer means is to be immersed in said bath, said guide track being engageable with a portion of said skimmer means to pivot the same to a position wherein said surface of said skimmer means is horizontal so that said skimming surface can break through the surface of said liquid bath in a horizontal position to have said first liquid adhere to said skimming surface, said skimmer means being pivotally movable upon disengagement thereof from said guide track to position said skimming surface vertically for draining said first liquid therefrom, and a collector into which said first liquid drains from said skimming surface in said vertical position thereof.

9. The skimming apparatus of claim 8 in which said skimmer means comprises an angle plate including a first portion having said skimming surface thereon and a second portion at an angle to said first portion and engageable with said guide track to position said skimming surface horizontally.

10. The skimming apparatus of claim 9 in which a plurality of said angle plates are pivotally suspended from said conveyor means in spaced relation with each other.

11. In an apparatus for separating from a common liquid body two immiscible liquids of substantially different density, the combination of a substantially planar sheet of material for which the less dense liquid has a greater affinity than does the more dense liquid and having an angularly related portion adjacent one edge thereof, means for carrying said sheet downwardly into and upwardly out of said liquid body, means interposed between said sheet and said carrying means for engaging said angularly related portion and positioning said sheet substantially horizontally as said sheet is raised through the surface of said liquid body so that said less dense liquid preferentially adheres to said sheet, said last means terminating above the surface of the liquid body to allow said sheet to move to a substantially vertical position after said sheet has been raised from said liquid body, and means for recovering the liquid which gravitationally runs off from the tilted sheet.

References Cited

UNITED STATES PATENTS

| | | | |
|---|---|---|---|
| 616,192 | 12/1898 | King | 210—470 |
| 670,247 | 3/1901 | Rauch | 210—359 |
| 1,864,359 | 6/1932 | Laughlin et al. | 210—160 |
| 2,064,792 | 12/1936 | Fischer | 210—525 |
| 2,330,508 | 9/1943 | McColl. | |
| 2,355,130 | 8/1944 | Yerkes | 210—470 X |
| 2,572,524 | 10/1951 | Schmeiler | 210—470 |
| 3,146,192 | 8/1964 | McClintock | 210—40 |
| 3,314,540 | 4/1967 | Lane | 210—77 |
| 3,314,545 | 4/1967 | Grabbe et al. | 210—401 X |

FOREIGN PATENTS

| | | |
|---|---|---|
| 231,579 | 2/1911 | Germany. |
| 236,149 | 6/1911 | Germany. |

REUBEN FRIEDMAN, *Primary Examiner.*

J. ADEE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,098                        September 24, 1968

Gene Hirs

It is certified that error appears in the above identified patent and that said Letters Patent are hereby corrected as shown below:

Column 1, line 17, "including" should read -- inclining --; line 23, "included" should read -- inclined --. Column 2, line 33, "is" should read -- in --.

Signed and sealed this 17th day of March 1970.

(SEAL)
Attest:

Edward M. Fletcher, Jr.                     WILLIAM E. SCHUYLER, JR.
Attesting Officer                             Commissioner of Patents